(12) United States Patent
Taylor et al.

(10) Patent No.: US 7,641,795 B2
(45) Date of Patent: Jan. 5, 2010

(54) MEMBRANE CONTACTOR

(75) Inventors: Gareth P. Taylor, Indian Trail, NC (US); Timothy D. Price, Monroe, NC (US)

(73) Assignee: Celgard LLC, Charlotte, NC (US)

( * ) Notice: Subject to any disclaimer, the term of this patent is extended or adjusted under 35 U.S.C. 154(b) by 460 days.

(21) Appl. No.: 11/447,188

(22) Filed: Jun. 5, 2006

(65) Prior Publication Data

US 2007/0278145 A1    Dec. 6, 2007

(51) Int. Cl.
B01D 63/02 (2006.01)
B01D 63/04 (2006.01)
B01D 63/08 (2006.01)
B01D 63/00 (2006.01)

(52) U.S. Cl. .................. 210/321.79; 210/650; 210/652; 210/321.6; 210/321.88; 96/8; 96/10

(58) Field of Classification Search ........................ None
See application file for complete search history.

(56) References Cited

U.S. PATENT DOCUMENTS 4,959,152 A * 9/1990 Nichols ........................ 210/651
5,174,900 A   12/1992 Nichols et al.

FOREIGN PATENT DOCUMENTS

| EP | 0414367 A1 | 2/1991 |
| JP | 5184879 | 7/1993 |
| WO | WO 0185315 A1 | 5/2001 |
| WO | WO 03051495 A1 | 6/2003 |

* cited by examiner

Primary Examiner—Krishnan S Menon
(74) Attorney, Agent, or Firm—Hammer & Associates, P.C.

(57) ABSTRACT

A membrane contactor includes a housing, a stack of membrane mats, and a cap. The housing has a closed end and an open end. The closed end includes an outlet port. The cap is united to the open end and includes an inlet port. A stack of membrane mats is within the housing stacked substantially perpendicular to the longitudinal axis of the housing. Each membrane mat has a plurality of hollow fiber members. A potting material bonds the membrane mats to each other and simultaneously bonds one end of the stack to the closed end and bonds the other end of the stack to the cap. The potting material forms an internal chamber and at least one external chamber within the housing. The hollow fiber members extend through the potting material from the internal chamber into the external chambers. The inlet port and the outlet port are in communication with the internal chamber. At least one side port is in communication with the external chambers.

26 Claims, 5 Drawing Sheets

Fig. 2B
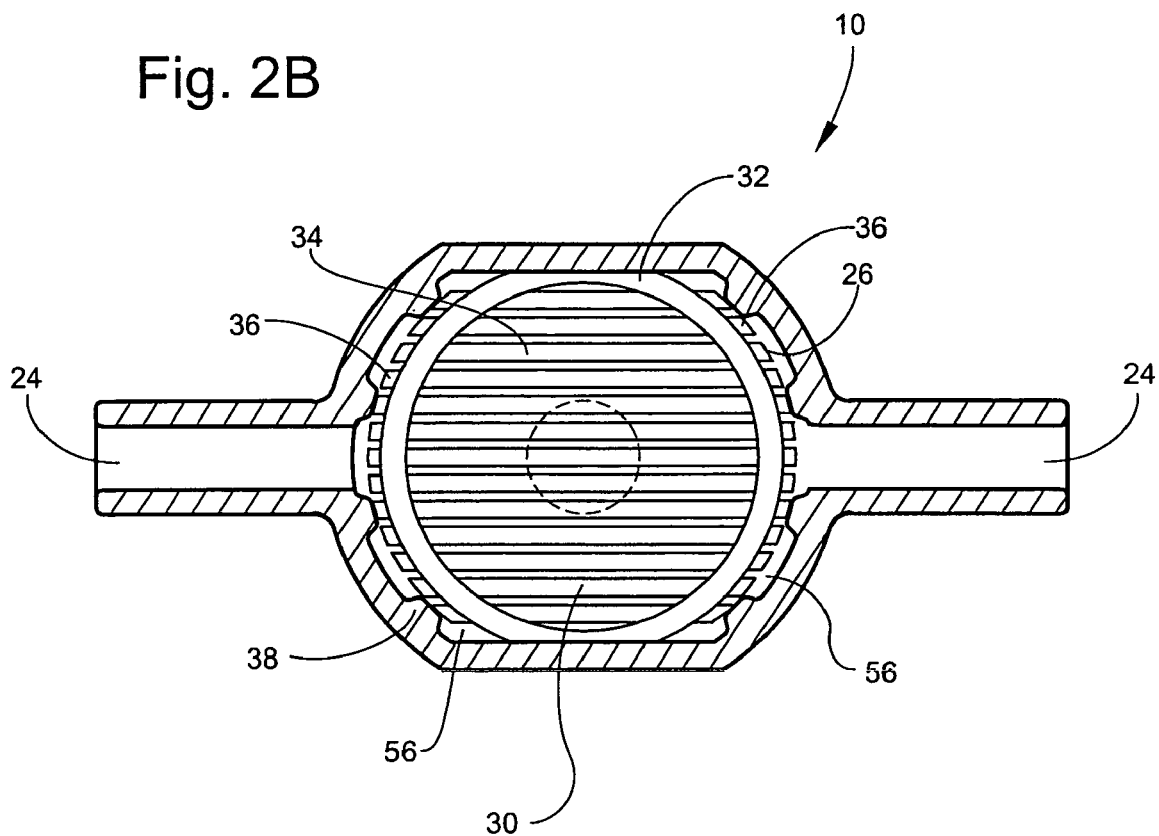
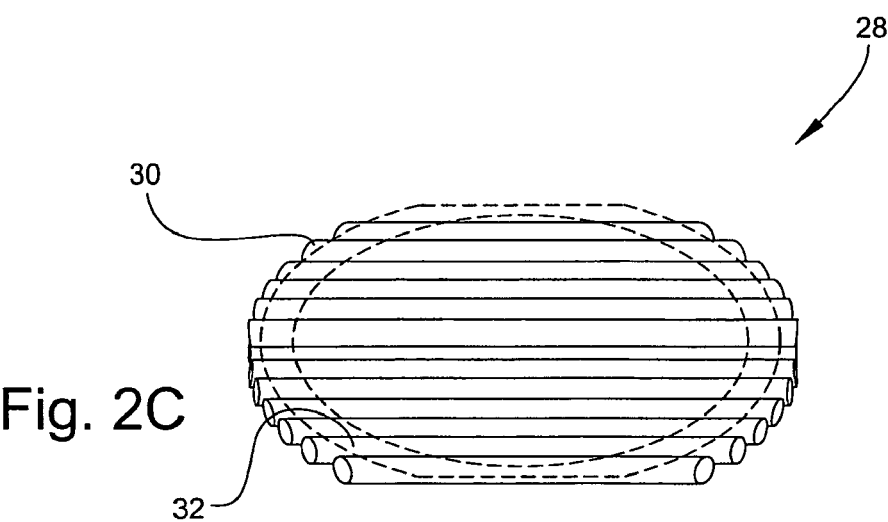
Fig. 2C

MEMBRANE CONTACTOR

FIELD OF INVENTION

The instant application relates to a membrane contactor and its method of manufacture.

BACKGROUND OF THE INVENTION

A membrane contactor may be used for many purposes, including but not limited to, removing entrained gases from liquids, debubbling liquids, filtering liquids, and adding a gas to a liquid. Membrane contactors may be used in many different applications, for example, a membrane contactor may be used in removing entrained gases from inks used in printing.

Current designs for membrane contactors include hollow fiber mats embedded in an annular ring of potting material where the ends of the hollow fiber members are open. These embedded mats are then inserted into a housing substantially perpendicular to the major axis of the housing to form the device. The current designs are effective but have many problems.

The designs are costly to make because they require the use of a casting mold. Because the ends of the hollow fiber members have to be opened for the device to function, the casting mold requires an extra step to keep these ends open. This requires the mold to be broken away so that the ends of the fibers are exposed. This step can be done by machining away the mold. This is a costly process because it is labor intensive and time consuming. This step of breaking away the casting mold also requires the devices to be larger than desired. The larger size of the device raises the price of the materials and prevents the devices from fitting in smaller spaces. Another problem with the current design is that the strength of the device is dependent primarily on the potting material wall itself.

Accordingly, there is a need for a membrane contactor and a method of its manufacture that addresses all of these problems.

SUMMARY OF THE INVENTION

The instant invention is a membrane contactor. The membrane contactor includes a housing, a stack of membrane mats, and a cap. The housing has a closed end and an open end. The closed end includes an outlet port. The cap is united to the open end and includes an inlet port. A stack of membrane mats is within the housing stacked substantially perpendicular to the longitudinal axis of the housing. Each membrane mat has a plurality of hollow fiber members. A potting material bonds the membrane mats to each other and simultaneously bonds one end of the stack to the closed end and bonds the other end of the stack to the cap. The potting material defines an internal chamber and at least one external chamber within the housing. The hollow fiber members extend from the internal chamber through the potting material into the external chambers. The inlet port and the outlet port are in communication with the internal chamber. At least one side port is in communication with the external chambers.

BRIEF DESCRIPTION OF THE DRAWINGS

For the purpose of illustrating the invention, there is shown in the drawings a form that is presently preferred; it being understood, however, that this invention is not limited to the precise arrangements and instrumentalities shown.

FIGS. 2a, 2b, and 2c illustrate an embodiment of a membrane contactor.

DETAILED DESCRIPTION OF THE INVENTION

Figure 1A:
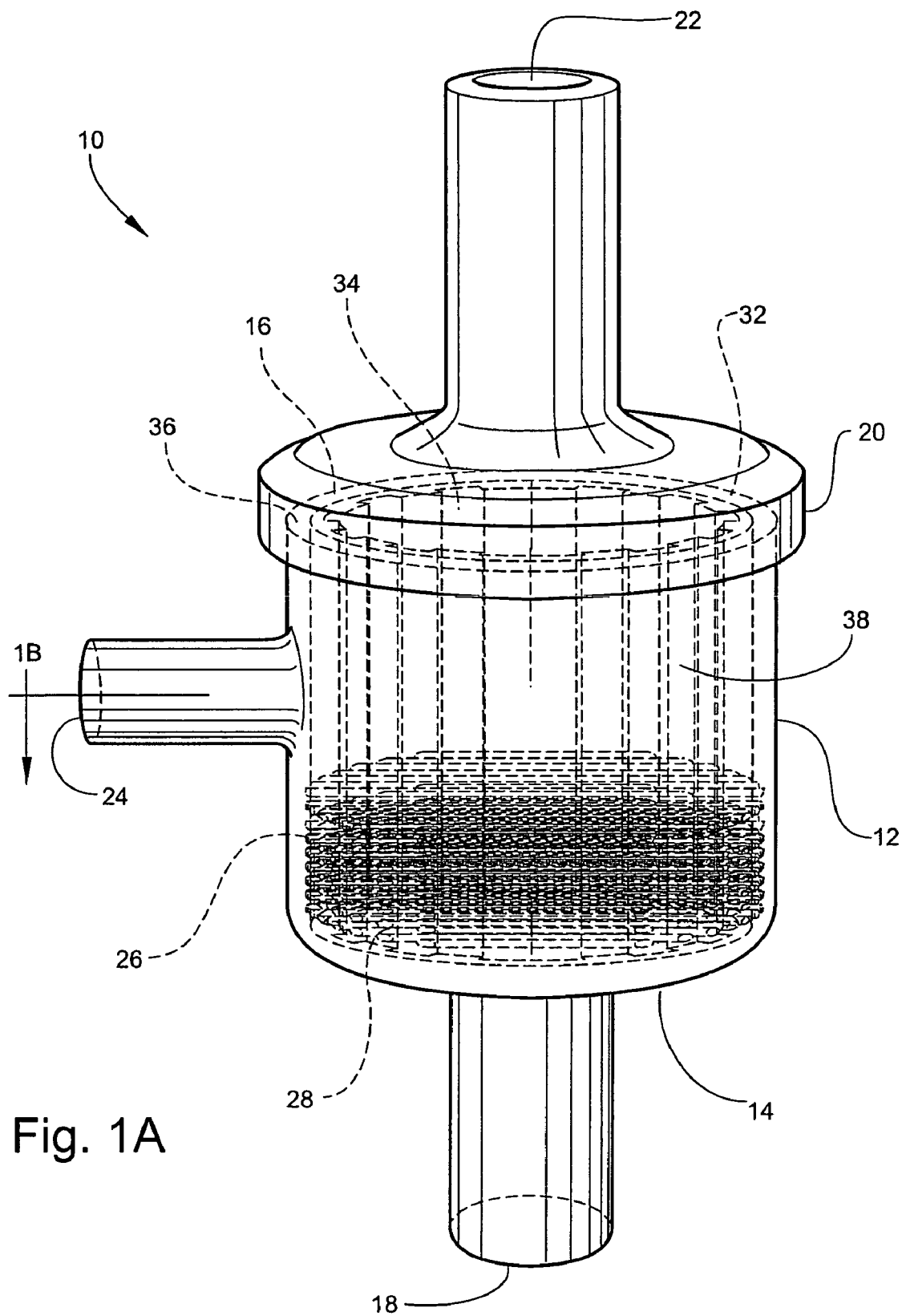
FIGS. 1a, 1b, and 1c illustrate an embodiment of a membrane contactor.

Referring to the drawings wherein like numerals indicate like elements, there is shown, in FIG. 1a an embodiment of a membrane contactor 10. Membrane contactor 10 may be used for many purposes, including, but not limited to, removing entrained gases from a liquid, debubbling a liquid, filtering a liquid, or adding a gas to a liquid. The membrane contactor 10 generally includes a housing 12, a stack 26 of membrane mats 28, a cap 20, and a potting material 32 (See FIGS. 1a, 2a and 3a).

Figure 1B:
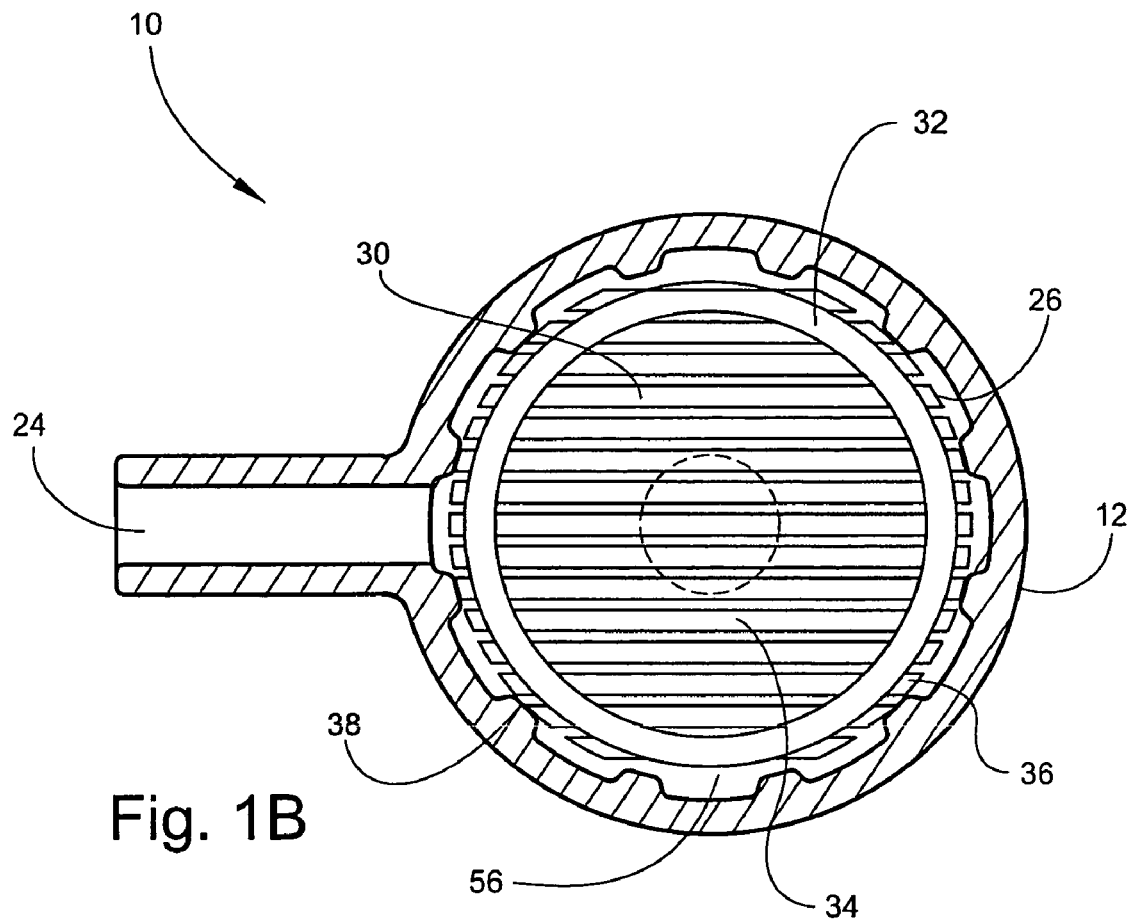
Figure 2A:
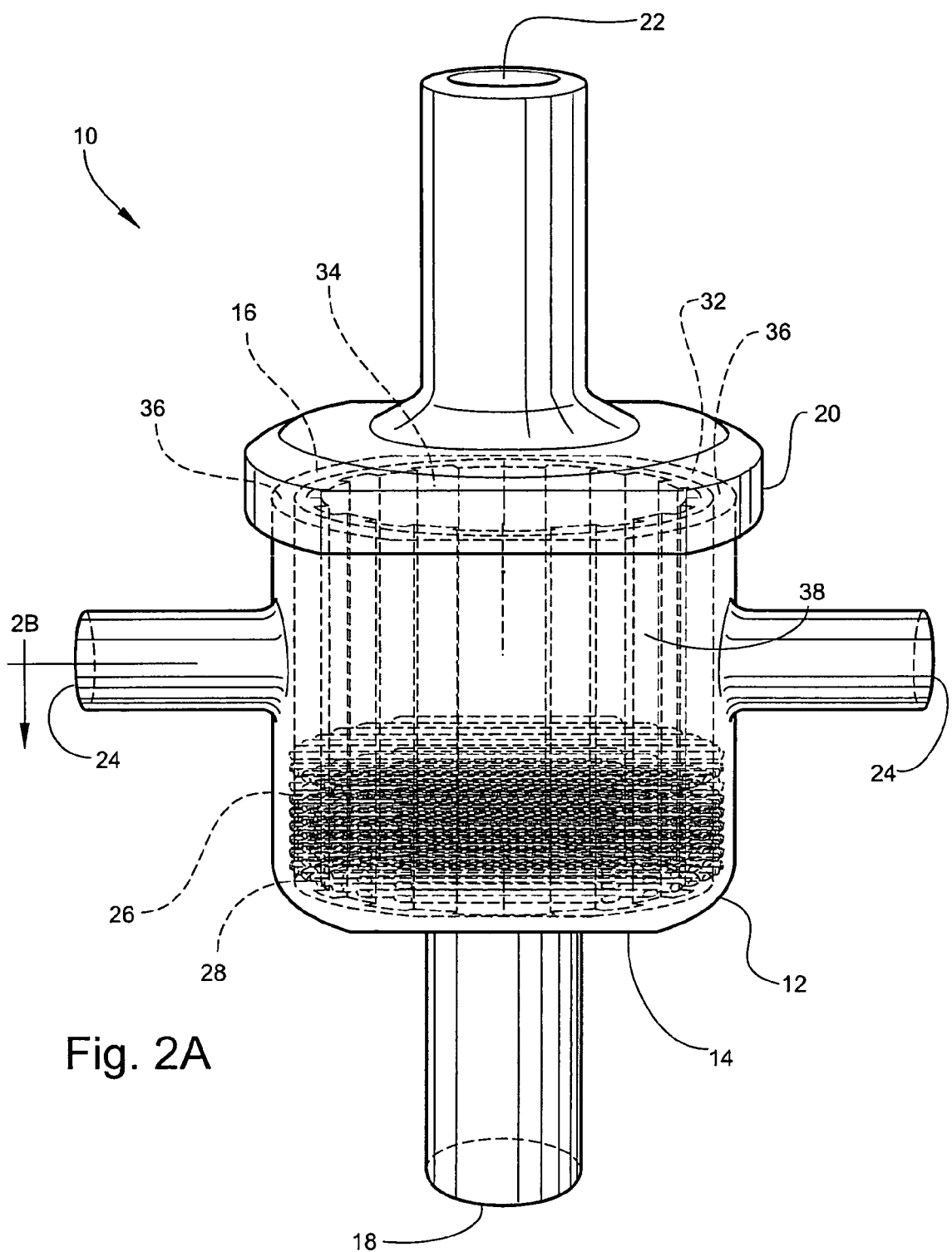
Figure 3A:
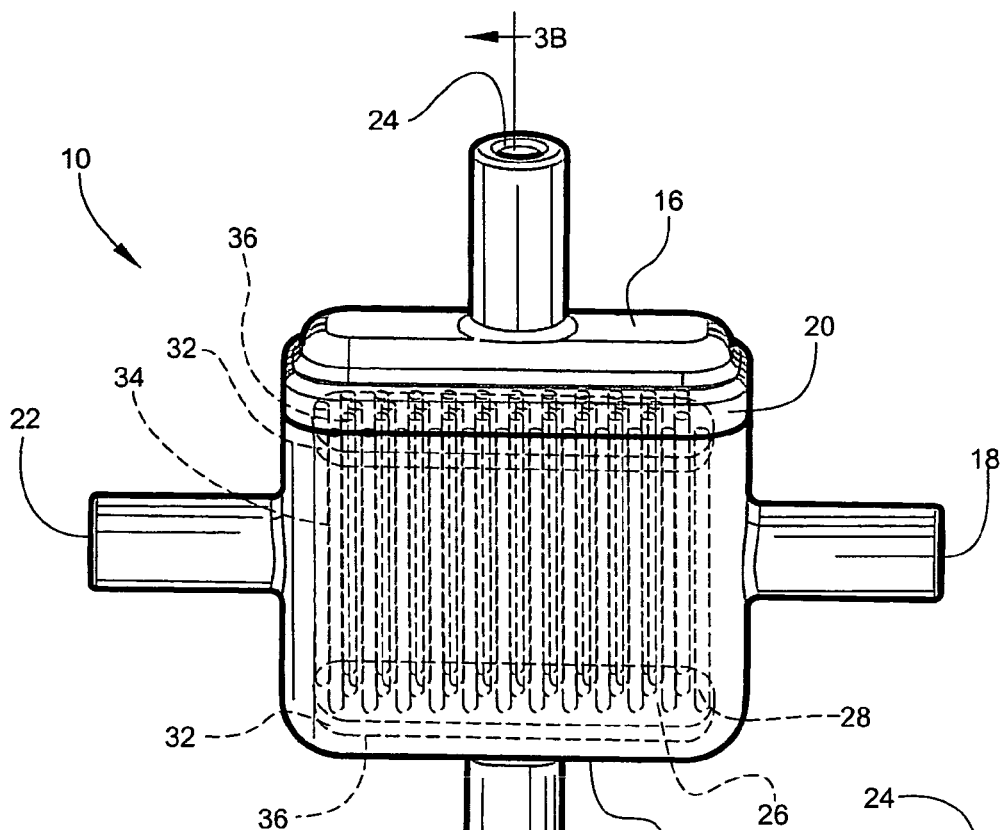
FIGS. 3a, 3b, and 3c illustrate an embodiment of a membrane contactor.

Housing 12 may be a generally cup shaped housing with a closed end 14, and an open end 16 (see FIGS. 1a, 2a and 3a). Housing 12 may be sized to receive stack 26 of membrane mats 28. A potting material 32 may divide housing 12 into an internal chamber 34 and at least one external chamber 36. Housing 12 may be made of any material, including, metal, plastic, or composite. Preferably, housing 12 may be a molded piece. Housing 12 may, for example, be fabricated from a rigid FDA grade material, such as polycarbonate. Housing 12 may be of any shape, including, cylindrical (FIGS. 1a and 1b), Double 'D' (FIGS. 2a and 2b), and rectangular (FIGS. 3a and 3b).

Cap 20 may be united to open end 16 of housing 12 (see FIGS. 1a, 2a and 3a). Cap 20 may be for closing housing 12. An inlet port 22 (FIGS. 1a and 2a) or side port 24 (FIG. 3a) may be included in Cap 20. Preferably, cap 20 includes a generally truncated open-ended cone. Cap 20 may include an annular grove for allowing air flow through all of headspace 56. After stack 26 may be inserted into housing 12, cap 20 may be united to housing 12. Preferably, cap 20 may be united by an air-tight seal to the exterior walls of housing 12. Such sealing means may include gluing, welding, spin welding, threading, O-rings, and the like.

An inlet port 22 and an outlet port 18 may be included in membrane contactor 10 (see FIGS. 1a, 2a and 3a). Closed end 14 may include outlet port 18 for receiving a liquid into housing 12. Cap 20 may include inlet port 22 for discharging the liquid from housing 12. Inlet port 22 and outlet port 18 may be in communication with internal chamber 34. In combination, inlet port 22 and outlet port 18, may allow a fluid to be moved through housing 12 in internal chamber 34. Inlet port 22 and outlet port 18 may be reversible allowing fluid to flow through membrane contactor 10 in either direction. Additionally, inlet port 22 and outlet port 18 may be provided with detachable couplings for coupling the membrane contactor 10 to a fluid system. The detachable coupling may include quick-connect fitting, threaded fittings, compression fittings, twist-lock fittings, Luer fitting, or other fittings for connection to a fluid line.

At least one side port 24 may be provided in housing 12 (see FIGS. 1a, 2a and 3a). Side ports 24 may be between open end 16 and closed end 14 (see FIGS. 1a and 2a). Alternatively, side ports 24 may be included in cap 20 and closed end 14 (see FIG. 3a). Side ports 24 may be in communication with external chambers 36. Side ports 24 may be for providing a vacuum or partial vacuum to external chambers 36 or may be for sweeping a gas through housing 12 from one external chamber 36 to another external chamber 36. Preferably, there should be one side port 24 positioned at the center of every external chamber 36 (see FIGS. 1b, 2b, and 3b). Additionally, each side port 24 may be provided with a detachable fitting including, but not limited to, quick-connect fittings, threaded fittings, compression fittings, twist-lock fittings, Luer fitting, or other fittings for connection to a vacuum line, gas line or fluid line.

Stack 26 may be inserted into housing 12 (see FIGS. 1a, 2a, and 3a). The stack 26 of membrane mats 28 is sandwiched between closed end 14 and cap 20. Stack 26 may include a plurality of membrane mats 28. Potting material 32 may bond stack 26 together and hold stack 26 in place in housing 12. Membrane mats 28 may be stacked so that hollow fiber members 30 of each membrane mat 28 are aligned allowing a gas to be swept through membrane contactor 10. Membrane mats 28 may also be stacked so that hollow fiber members 30 of every other membrane mat 28 are perpendicularly aligned allowing a gas to be swept through in two different directions in membrane contactor 10 or allowing two different gases to be swept through membrane contactor 10.

Membrane mats 28 may be stacked in housing 12 (see FIGS. 1a, 2a and 3a). The membrane mats 28 may be woven, knitted, or otherwise joined together in generally planar structures containing a plurality of joined together hollow fiber members 30. Membrane mats 28 are shown with exaggerated hollow fiber members 30 in FIGS. 1c, 2c and 3c. Membrane mats 28 may be stacked substantially perpendicular to the longitudinal axis of housing 12. The dimension of membrane mats 28 may be slightly smaller than housing 12 so that when stack 26 may be inserted into housing 12 a headspace 56 may be created between the peripheral wall of stack 26 and the interior wall of housing 12 (see FIGS. 1b, 2b and 3b). Membrane mats 28 may be cut to any shape, including but not limited to, circular (see FIG. 1c), Double 'D' shaped (see FIG. 2c) or rectangular (see FIG. 3c). Membrane mats 28 may also be cut into strips. These strips may be folded, wound up, etc. to form a rectangular cross section of stack 26 (see FIG. 3c). These strips of membrane mats 28 being folded, wound up, etc. may allow membrane contactor 10 to be smaller because the strips may hold together better and may prevent loose ends.

Figure 1C:
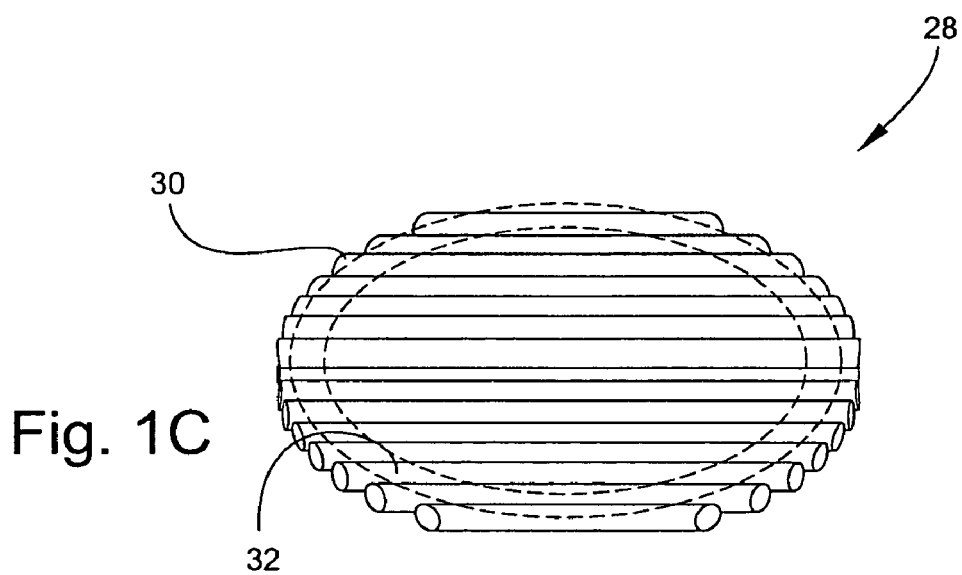
Figure 3C:
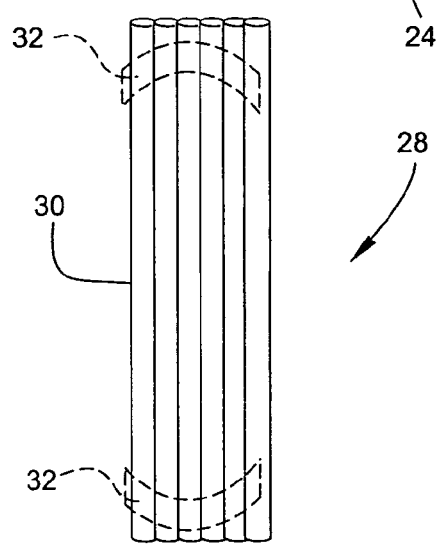
Figure 3B:
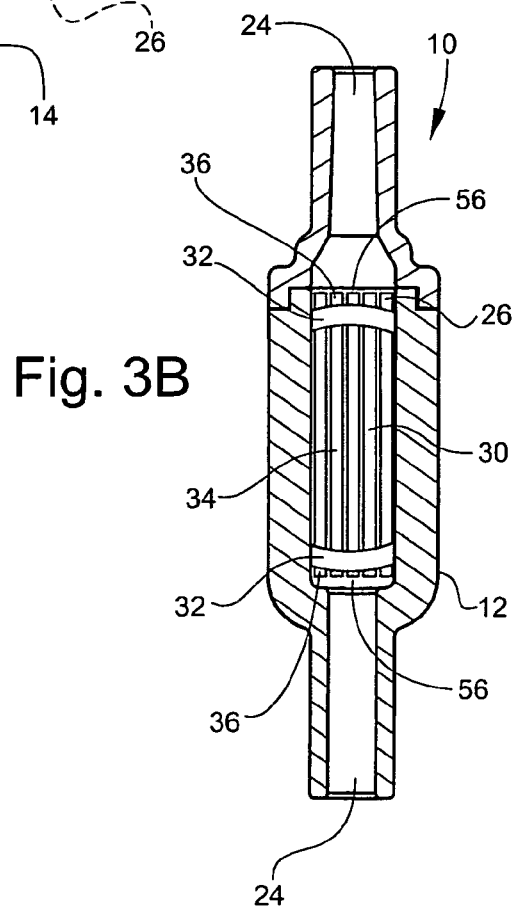

Hollow fiber members 30 may be included in membrane mats 28 (see FIGS. 1c, 2c and 3c). Hollow fiber members 30 may extend from internal chamber 34 through potting material 32 into external chambers 36. Hollow fiber members 30 may be for communicating between internal chamber 34 and external chamber 36 allowing removal of entrained gases from a liquid, debubbling of a liquid, filtering of a liquid, or adding a gas to a liquid. Hollow fiber members 30 of membrane mats 28 may be of like materials and properties, or may be of various materials and/or properties. Hollow fiber members 30 may be fibers having a lumen and a wall surrounding the lumen. Hollow fiber members 30 may have solid walls, porous walls, or microporous walls (e.g., symmetric pores, asymmetric pores, skinned membranes and the like). Hollow fiber members 30 may be made of any suitable FDA grade materials. Such materials include polyolefins (e.g., polyethylene, polypropylene, polybutene, poly methyl pentene), polysulfones (e.g., polysulfone, polyethersulfone, polyarylsulfone), cellulose and its derivations, PVDF, poly phenyl oxide (PPO), PFAA, PTFE, other fluorinated polymers, polyamides, polyether imides (PEI), polyimides, ion-exchange membranes (e.g., Nafion®), etc.

Potting material 32 may be for providing a fluid-tight annular wall within membrane contactor 10 (see FIGS. 1b, 2b and 3b). Potting material 32 may be a fluid-tight annular wall (see FIG. 1b) or partial annular walls (see FIGS. 2b and 3b) that divide housing 12 into an internal chamber 34 and at least one external chamber 36. The fluid-tight annular wall or partial annular walls defined by potting material 32 may be bonded to the closed end 14 and cap 20, and may be further continuous or integral through stack 26 between membrane mats 28. This may allow potting material 32 to distribute the strength of the device to housing 12 and cap 20. Potting material 32 may maintain a fluid-tight engagement between housing 12 and the stack 26 of membrane mats 28 between closed end 14 and cap 20. Potting material 32 may be any material, for example, any suitable FDA grade thermosetting materials or any suitable FDA grade thermoplastic materials. Exemplary materials for potting material 32 include, but are not limited to, epoxy, polyolefins, and polyurethane.

Internal chamber 34 may be divided by potting material 32 from external chambers 36 within housing 12 (see FIGS. 1b, 2b and 3b). Internal chamber 34 may be in communication with inlet port 22 and outlet port 18. Internal chamber 34 may be for allowing a fluid to move through stack 26 in membrane contactor 10.

At least one external chamber 36 may be included in housing 12 (see FIGS. 1b, 2b and 3b). External chambers 36 may be for providing a space for the peripheral edge of stack 26 where the ends of hollow fiber members 30 may remain open. A headspace 56 may be included in external chambers 36. External chambers 36 may allow hollow fiber members 30 to communicate from internal chamber 34 through plotting material 32 to headspace 56.

Headspace 56 may be included within external chambers 36 (see FIGS. 1b, 2b and 3b). Headspace 56 may be defined by the space between the peripheral walls of stack 26 and the interior surface of housing 12. Headspace 56 may allow communication between side ports 24 and the open ends of the hollow fiber members 30 of the membrane mats 28. Headspace 56 may include a plurality of baffles 38.

Baffles 38 may be included in headspace 56 (see FIGS. 1b and 2b). Baffles 38 may be for centering stack 26 within housing 12. Baffles 38 may also be for facilitating air flow through headspace 56. Baffles 38 may be any structures that center stack 26 within housing 12 or that facilitate air flow through headspace 56. Baffles 38 may be positioned longitudinally on the inner wall of housing 12.

In operation, membrane contactor 10 may be used to remove entrained gases from a fluid, debubble a fluid, filter a fluid, or add gas to a liquid. For example, a fluid may be introduced into membrane contactor 10 via inlet port 22 and exit via outlet port 18 (or vice versa). As the fluid travels over the external surfaces of the hollow fiber members 30, gases may be removed (entrained gases or bubbles) or added, and unwanted materials may be blocked (filtration). Depending upon the use of the module, the characteristics of the hollow fiber will change.

In the removal of entrained gases and debubbling mode, as the fluid travels through internal chamber 34, the gases may be removed by passing through the wall of the hollow fiber members 30, into the lumen, and out through side ports 24 by way of headspace 56. Removal of the gases may be facilitated by application of a vacuum or partial vacuum by way of side ports 24. Removal of the gases may also be facilitated by sweeping a gas through membrane contactor 10 by way of side ports 24. Gases that may be swept through membrane contactor 10 by way of side ports 24 to facilitate removal of gases from a liquid include, but are not limited to, carbon dioxide, nitrogen, oxygen, etc. When membrane contactor 10 may have more than one side port 24, ambient air may also be used in facilitating removal of gases from a liquid. One side port 24 may be left open while the other side ports 24 are hooked up to a vacuum line. Thus, when the vacuum is applied, ambient air from outside of membrane contactor 10 may be swept through membrane contactor 10. Sweeping a gas through membrane contactor 10, like carbon dioxide, may also facilitate removal of any condensation buildup in membrane contactor 10.

Alternatively, in the adding a gas to a liquid mode, gases (such as carbon dioxide, nitrogen, oxygen, etc.) may be introduced into a fluid. As the fluid flows through internal chamber 34, the gas may be introduced through side ports 24 at a lower pressure than the liquid in internal chamber 34. The lower pressure allows the gas to absorb into the liquid, which may reduce bubbling of the gas in the liquid. Gas may then move from side ports 24 to headspace 56 and into hollow fiber lumens and out through the wall of the hollow fiber members 30 into the fluid. Gas in side ports 24 may be introduced into the fluid by supplying gas to side ports 24 at a pressure. This pressure may be low, thus, allowing the gas to absorb into the liquid which reduces bubbling of the gas in the liquid.

In the filtration mode, contaminated fluid is introduced via inlet port 22 or outlet port 18 and exits via side ports 24 (or vice versa). Fluid travels through the hollow fiber members 30 from internal chamber 34 to the external chambers 36 and the walls of the hollow fiber members 30 block contaminants.

The membrane contactor 10 may provide several performance enhancements over other devices when used in removing entrained gases from liquids, or debubbling liquids. Because of its design, membrane contactor 10 may provide a less restrictive flow path from inlet port 22 to outlet port 18, which results in less pressure drop in the fluid moving through internal chamber 36. The less the pressure drop is in external chamber 36, the less effect membrane contactor 10 has on the fluid system. Membrane contactor 10 may be designed with more hollow fiber members 30 that are shorter instead of fewer long hollow fiber members 30. These shorter hollow fiber members 30 may result in less pressure drop in the hollow fiber members 30, which may provide better performance in membrane contactor 10 when used in removing entrained gases or debubbling a liquid. As a result of these enhanced performances, membrane contactor 10 may provide greater performance than a device with an equivalent amount of membrane area.

The membrane contactor 10 is manufactured as follows:

Referring to FIGS. 1*a*, 2*a*, and 3*a*, housing 12 may be filled with stack 26 of membrane mats 28. Membrane mats 28 may be dimensioned to almost fill the cavity of housing 12 and may be stacked so that they are substantially perpendicular to the longitudinal axis of housing 12. Housing 12 and cap 20 may be made of any material. Such materials include polyolefins, polyvinyl chloride, ABS, Noryl®, PVDF, PFA, or other fluorinated plastics, fiber-reinforced plastics, polysulfones, polycarbonates, polyamides, metals, etc.

The membrane mats 28 may be woven, knitted, or otherwise joined together in generally planar structures containing a plurality of joined together hollow fiber members 30. The hollow fiber members 30 of the membrane mats 28 may be of like materials and properties, or may be of various materials and/or properties. These membrane mats 28 may be cut from a larger fabric to the desired size and shape to fit within housing 12. Cutting may be accomplished by die cutting, ultrasonic cutting, knife cutting (e.g., hot), etc.

Hollow fiber members 30 may be fibers having a lumen and a wall surrounding the lumen. Hollow fiber members 30 may have solid walls, porous walls, or microporous walls (e.g., symmetric pores, asymmetric pores, skinned membranes and the like). These hollow fibers may be made of any material. Such materials include polyolefins (e.g., polyethylene, polypropylene, polybutene, poly methyl pentene), polysulfones (e.g., polysulfone, polyethersulfone, polyarylsulfone), cellulose and its derivations, PVDF, poly phenyl oxide (PPO), PFAA, PTFE, other fluorinated polymers, polyamides, polyether imides (PEI), polyimides, ion-exchange membranes (e.g, Nafion®), etc.

Cap 20 may be placed over open end 16 of housing 12 after stack 26 may be inserted into housing 12. Cap 20 may be united to housing 12. This uniting may be accomplished by any means, for example, gluing, welding, or threading. Cap 20 may be joined along its contact surface with housing 12. The housing 12 and cap 20 sandwich the stack 26 of membrane mats 28 and hold the mats in place during the next operation of the manufacture process.

Before spinning, all side ports 24 may be plugged. Because centrifugal forces may force the fluids to the exterior of housing 12, where side ports 24 are located, plugging of side ports 24 may be done to maintain the fluids in housing 12 when housing 12 is spun in the following steps. Plugging of side ports 24 may be done by any device, including but not limited to, a cork, a plug, a stopper, a cap, etc.

The housing 12 and cap 20 may be mounted via outlet port 18 or inlet port 22 onto a device that can spin the membrane contactor 10 about the center longitudinal axis of housing 12.

During spinning, a boundary fluid is introduced into either outlet port 18 or inlet port 22. The boundary fluid, by action of centrifugal force, runs to the interior wall of housing 12 thereby forming a boundary wall or partial boundary walls (depending on the shape of housing 12). The boundary wall may provide a space for the peripheral edge of stack 26 (external chambers 36), thus, keeping the ends of hollow fiber members 30 open at all steps of the manufacturing process.

Potting material 32 may be introduced into either outlet port 18 or inlet port 22 after the boundary fluid is inserted. The potting material 32, by action of centrifugal forces, runs to the interior walls of housing 12. Because the boundary fluid may be inert to potting material 32 and may be denser than potting material 32, potting material 32 thereby forms an annular ring or partial annular ring (depending on the shape of housing 12) against the boundary wall. Spinning is preferably stopped when potting material 32 has had sufficient time to solidify to a point that it will no longer run or substantially run (i.e., retains or substantially retains the shape of the annular wall).

Potting material 32 may be any material, for example, thermosetting or thermoplastic materials. These materials are chosen with the following exemplary considerations: bond strength to the hollow fiber members 30, housing 12 and cap 20, mechanical strength, and chemical resistance. Exemplary materials for potting material 32 include, but are not limited to, epoxy and polyolefins.

The foregoing spinning step may be further illustrated as follows, it being understood that the invention is not so limited: Housing 12 may be spun horizontally. Spinning speeds may be 150-5000 rpm (depending upon, for example, potting viscosity). If cure is performed at ambient temperatures, spinning till substantially no flow could take up to 24 hours; but, if cure is at higher temperatures, then cure times may be shortened, for example at 50° C., spinning time could be dropped to 2 hours, and at 65° C., spinning time to 0.5-0.75 hours.

After potting material 32 may be cured, side ports 24 may be opened. This step allows the boundary fluid to be emptied. Emptying of the boundary fluid may be facilitated by spinning housing 12 as in the previous step after side ports 24 are opened. Once the boundary fluid is emptied, membrane contactor 10 may be in its final form.

This manufacturing process provides many advantages over the current processes. This process may eliminate the need to machine the embedded stacks after potting and may eliminate any steps of assembly. Thus, this process may significantly reduce the time and costs of manufacturing. Also, since there is no machining after potting, the risk of contaminants getting into the device may be reduced. With this process, there are only two molded parts needed to produce the device, thus, making the device very simple. Since the product ends up being a single integral device there are minimal hold-up volumes available for the fluid. There are also no dead spots. Another advantage is that this process provides a product where the strength of the potting material 32 may be reinforced by housing 12, because the potting material 32 not only is bonded to the membrane mats 28 but also to housing 12. Also, the size of membrane contactor 10 may be relatively small since clearance for assembly is not required and the device is reduced to the bare essentials.

Referring to FIG. 1a, housing 12 is shown in final form and has a cylindrical shape. Headspace 56 is defined between the peripheral wall of stack 26 and the interior surface of housing 12. Because housing 12 has a cylindrical shape, the boundary fluid formed a single annular boundary wall during spinning, and potting material 32 formed a complete annular ring up against the annular boundary wall. This produces a single external chamber 36 around the entire potting material 32 and allows for a single side port 24 to communicate with all of headspace 56 (see FIG. 1b).

Referring to FIG. 2a, housing 12 is shown in final form and has a Double 'D' shape. Headspace 56 is defined between the peripheral wall of stack 26 and the interior surface of housing 12. Because housing 12 has a Double 'D' shape, the boundary fluid formed two partial annular boundary walls during spinning, and potting material 32 formed two partial annular rings up against the annular boundary walls. This produces two external chambers 36 around the potting material 32 and requires two side ports 24 to communicate with all of headspace 56 (see FIG. 2b). This embodiment allows a gas to be swept through membrane contactor 10 by providing two separate external chambers 36.

Referring to FIG. 3a, housing 12 is shown in final form and has a rectangular shape. Headspace 56 is defined between the peripheral wall of stack 26 and the interior surface of housing 12. Because housing 12 has a rectangular shape, the boundary fluid formed two partial annular boundary walls during spinning, and potting material 32 formed two partial annular rings up against the annular boundary walls. This produces two external chambers 36 around the potting material 32 and requires two side ports 24 to communicate with all of headspace 56 (see FIG. 3b). This embodiment allows a gas to be swept through membrane contactor 10 by providing two separate external chambers 36. Also, because housing 12 is rectangular, this embodiment allows membrane contactor 10 to be narrow, allowing it to operate in smaller spaces.

The present invention may be embodied in other forms without departing from the spirit and the essential attributes thereof, and, accordingly, reference should be made to the appended claims, rather than to the foregoing specification, as indicated the scope of the invention.

We claim:

1. A membrane contactor comprising:
   a housing having an open end and a closed end;
   said closed end comprising an outlet port;
   a cap being united to said open end comprising an inlet port;
   a stack of membrane mats within said housing where each said membrane mats being stacked substantially perpendicular to the longitudinal axis of said housing;
   said membrane mats comprising a plurality of hollow fiber members;
   a potting material bonding said membrane mats to each other and simultaneously bonding one end of said stack to said closed end and bonding the other end of said stack to said cap, thereby defining an internal chamber and at least one external chamber within said housing;
   said hollow fiber members extending from said internal chamber through said potting material into said at least one external chamber;
   said inlet port and said outlet port being in communication with said internal chamber; and
   at least one side port being in communication with said at least one external chamber.

2. The membrane contactor of claim 1 where said membrane mats being stacked so that a peripheral edge of each said membrane mat is aligned with said peripheral edge of the membrane mat below it.

3. The membrane contactor of claim 1 where said membrane mats being dimensioned slightly smaller than said housing so that when stacked and inserted into said housing a headspace is created between said peripheral edges of said mats and said housing.

4. The membrane contactor of claim 1 further comprising a plurality of baffles.

5. The membrane contactor of claim 1 where said inlet port and said outlet port further including detachable couplings for releasably engaging fluid delivery conduits.

6. The membrane contactor of claim 1 where said side port further including a fastener for releasably attaching a tube.

7. The membrane contactor of claim 1 having one said side port and one said external chamber;
   said one external chamber continuously surrounds said internal chamber allowing said one side port to be in communication with said one external chamber.

8. The membrane contactor of claim 7 where said housing having a cylindrical shape.

9. The membrane contactor of claim 1 where said membrane mats being stacked so that said hollow fiber members being aligned.

10. The membrane contactor of claim 9 where said membrane contactor having two said side ports and two said external chambers;
    said external chambers are separated by said potting material allowing a gas to be swept through said membrane contactor.

11. The membrane contactor of claim 10 where said housing having a Double 'D' shape.

12. The membrane contactor of claim 10 where said housing having a rectangular shape.

13. The membrane contactor of claim 1 where said membrane mats being stacked so that said hollow fiber members of every other said membrane mat being perpendicularly aligned.

14. The membrane contactor of claim 13 where said housing comprising four said side ports and at least two said external chambers where said side ports being positioned to allow a gas to be swept through said hollow fiber members in two different directions or to allow two different gases to be swept through said hollow fiber members.

15. A method of making a membrane contactor comprising the steps of:
- inserting a stack of membrane mats comprising hollow fiber members into a housing through an open end of said housing;
- uniting said open end with a cap comprising an inlet port;
- said housing having a closed end comprising an outlet port and having at least one side port between said closed end and said open end;
- plugging said side ports;
- spinning said membrane contactor at a velocity about an axis through the longitudinal center of said housing;
- inserting a boundary fluid into said inlet port or said outlet port, where said spinning forcing said boundary fluid to form an annular boundary or partial annular boundaries around the walls of said housing and keeping the ends of said hollow fiber members open;
- inserting a potting material into said inlet port or said outlet port where said spinning forcing said potting material to form an annular ring or partial annular rings against said annular boundary;
- continuing to spin said membrane contactor until said potting material is cured whereby bonding said membrane mats to each other and simultaneously bonding one end of said stack to said closed end and bonding the other end of said stack to said cap, thereby defining an internal chamber and at least one external chamber within said housing; and
- opening said side ports and emptying said boundary fluid.

16. The method of claim 15 where said boundary fluid being inert to said potting material and being denser than said potting material.

17. The method of claim 15 where said membrane contactor is heated to a temperature while spinning making the potting less viscous and facilitating the curing of said potting material.

18. The method of claim 15 where said housing having a cylindrical shape forcing said potting material to define one continuous said external chamber around said internal chamber.

19. The method of claim 15 where said housing having a Double 'D' shape forcing said potting material to define two said external chambers around said internal chamber.

20. The method of claim 15 where said housing having a rectangular shape forcing said potting material to define two said external chambers around said internal chamber.

21. A method for removal of entrained gases in a liquid, or debubbling a liquid, comprising the steps of:
- passing the liquid through at least one membrane contactor, wherein said membrane contactor comprising;
- a housing having an open end and a closed end;
- said closed end comprising an outlet port;
- a cap being united to said open end and comprising an inlet port;
- at least one side port in said housing between said open end and said closed end;
- a stack of membrane mats within said housing where each said membrane mat being stacked substantially perpendicular to the longitudinal axis of said housing;
- said stack of membrane mats being membrane mats stacked upon each other or a strip of membrane fabric folded upon itself or wrapped around itself;
- said membrane mats comprising a plurality of hollow fiber members;
- a potting material bonding said membrane mats to each other and simultaneously bonding one end of said stack to said closed end and bonding the other end of said stack to said cap, thereby defining an internal chamber and at least one external chamber within said housing;
- said hollow fiber members extending from said internal chamber through said potting material into said external chambers;
- said inlet port and said outlet port being in communication with said internal chamber; and
- said side ports being in communication with said external chambers;
- attaching said side ports to a vacuum line; and
- removing the entrained gases, debubbling, or filtering the liquid by forming a vacuum or a partial vacuum in said external chambers.

22. A method of sweeping a gas through a liquid for removal of entrained gases in a liquid, or debubbling a liquid comprising the steps of:
- passing the liquid through at least one membrane contactor, wherein said membrane contactor comprising;
- a housing having an open end and a closed end;
- said closed end comprising an outlet port;
- a cap enclosing said open end and comprising an inlet port;
- at least two side ports in said housing between said open end and said closed end;
- a stack of membrane mats within said housing where each said membrane mat being stacked substantially perpendicular to the longitudinal axis of said housing;
- said stack of membrane mats being membrane mats stacked upon each other or a strip of membrane fabric folded upon itself or wrapped around itself;
- said membrane mats comprising a plurality of hollow fiber members;
- a potting material bonding said membrane mats to each other and simultaneously bonding one end of said stack to said closed end and bonding the other end of said stack to said cap, thereby defining an internal chamber and at least two external chambers within said housing;
- said hollow fiber members extending from said internal chamber through said potting material into said external chambers;
- said inlet port and said outlet port being in communication with said internal chamber; and
- said side ports being in communication with said external chambers;
- attaching said side ports to a gas line; and
- sweeping a gas through the liquid by pushing or pulling said gas from one said side port through said hollow fiber members to another said side port.

23. A method of adding a gas to a liquid comprising the steps of:
- passing the liquid through at least one membrane contactor, wherein said membrane contactor comprising;
- a housing having an open end and a closed end;
- said closed end comprising an outlet port;
- a cap enclosing said open end and comprising an inlet port;
- at least two side ports in said housing between said open end and said closed end;
- a stack of membrane mats within said housing where each said membrane mat being stacked substantially perpendicular to the longitudinal axis of said housing;
- said stack of membrane mats being mats stacked upon each other or a strip of membrane fabric folded upon itself or wrapped around itself;

said membrane mats comprising a plurality of hollow fiber members;

a potting material bonding said membrane mats to each other and simultaneously bonding one end of said stack to said closed end and bonding the other end of said stack to said cap, thereby defining an internal chamber and at least two external chambers within said housing;

said hollow fiber members extending from said internal chamber through said potting material into said external chambers;

said inlet port and said outlet port being in communication with said internal chamber; and said side ports being in communication with said external chambers;

attaching said side ports to a gas line; and adding a gas to the liquid by pressurizing said gas line.

24. The membrane contactor of claim 1 where said stack of membrane mats being membrane mats stacked upon each other or a strip of membrane fabric folded upon itself or wrapped around itself.

25. The method of claim 15 where said stack of membrane mats being membrane mats stacked upon each other or a strip of membrane fabric folded upon itself or wrapped around itself.

26. A membrane contactor comprising:

a housing having an open end and a closed end;

said closed end comprising an outlet port;

a cap being united to said open end comprising an inlet port;

a stack of membrane mats within said housing where each said membrane mats being stacked substantially perpendicular to the longitudinal axis of said housing;

said membrane mats comprising a plurality of hollow fiber members;

a potting material bonding said membrane mats to each other and simultaneously bonding one end of said stack to said closed end and bonding the other end of said stack to said cap, thereby defining an internal chamber and at least one external chamber within said housing;

said hollow fiber members extending from said internal chamber through said potting where a portion of said hollow fiber members protruding into said at least one external chamber;

said inlet port and said outlet port being in communication with said internal chamber; and at least one side port being in communication with said at least one external chamber.

* * * * *